Aug. 7, 1951

C. K. BROWN, JR 2,563,154

HOT AND COLD WATER MIXING FAUCET

Filed Aug. 31, 1945

Inventor
CHARLES K. BROWN, JR.

By Howard J. Whelan.
Attorney

Patented Aug. 7, 1951

2,563,154

UNITED STATES PATENT OFFICE 2,563,154

HOT AND COLD WATER MIXING FAUCET

Charles K. Brown, Jr., Fairmont, W. Va.

Application August 31, 1945, Serial No. 613,921

2 Claims. (Cl. 277—11)

This invention relates to plumbing equipment, and more particularly to hot-and-cold water-mixing spigots or valves for basins and bathtubs.

This invention has among its objects to provide a new and improved hot-and-cold water-mixing spigot that will avoid one or more of the disadvantages and limitations of similar types of spigots previously developed in the prior art.

An additional object of this invention is to provide a new and improved hot-and-cold water-mixing spigot that will have control of the temperature and volume of the flow of water delivered from its delivery spout.

Another object of the present invention is to provide a new and improved water-mixing valve that will have a capacious mixing chamber, and, at the same time, provide a structure capable of presenting an attractive form.

Other objects will become apparent as the invention is more fully set forth.

In a particular form of this invention illustrated in the drawings, and described in the following specification by way of example, and whose scope is pointed out in the appended claims:

Similar reference characters refer to similar parts throughout the drawings.

Figure 2:
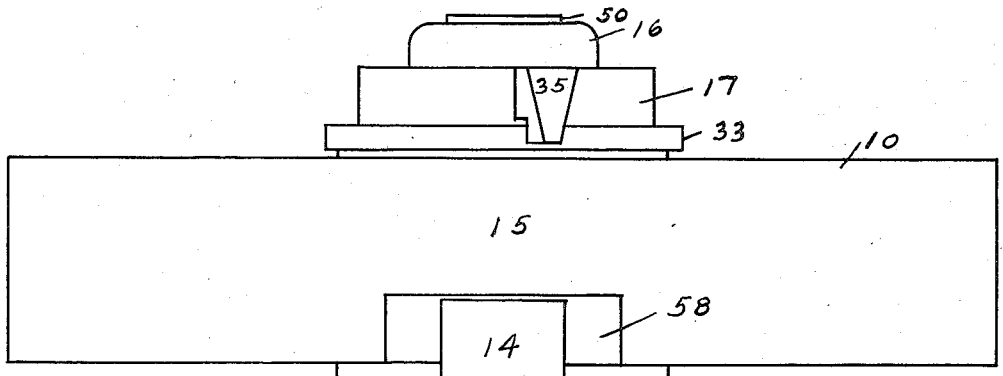
Figure 2 is a front elevation of Figure 1.
Figure 4:
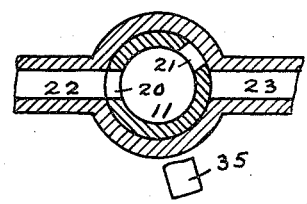
Figure 4 is a typical sectional view taken through the mixing valve with the cold water section turned on and hot water turned off.
Figure 5:
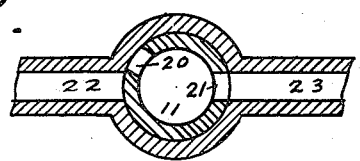
Figure 5 is a similar view to Figure 4, but with the hot water turned on and the cold water turned off.
Figure 3:
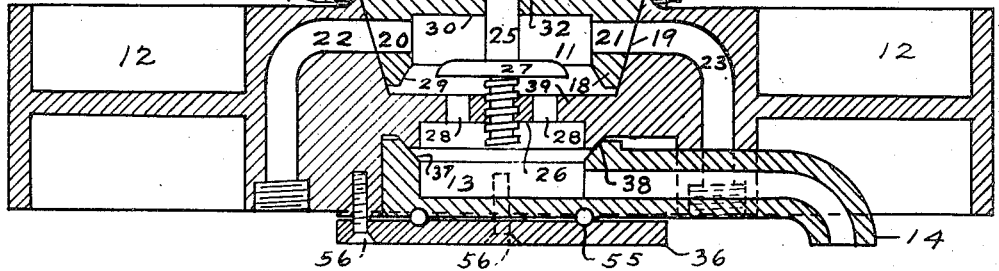
Figure 3 is a sectional view through Figure 1, on line 3—3—3 of Figure 1.
Figure 1:
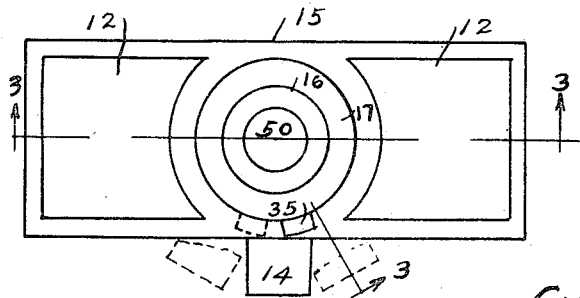
Figure 1 is a plan view of a hot-and-cold water-mixing valve and spigot embodying this invention.

In the construction shown 10 is the body of the spigot which extends broadly in a transverse direction to form a capacious mixing chamber 11 internally and soap dish structure 12 externally on top at both ends. From a lower chamber 13 of the body to which the mixing chamber 11 is connected is a delivery spout 14. The body 10 is provided with a slot 58 for spout 14 to operate in. The middle portion 15 of the body is formed as indicated and forms the housing for the water volume control 16 and temperature control 17. The temperature control consists of a tapered plug 18 fitting wedgingly into a tapered slot 19 in the body 10. Passages 20 and 21 for cold and hot water inflow respectively align with passages 22 and 23 respectively for connection to the cold and hot water services in a conventional manner. The plug 18 is tensioned in valve body by springs 59. The interior of the plug forms the mixing chamber 11 for hot and cold water, and is filled proportionately to the turning and alignment of the passages 20 and 21 with 22 and 23 by the operator. A handle 24 controls the movement of the screw stem 25 in the spider nut 26 formed at the bottom of the valve. A closure 27 is mounted on the stem and rises or lowers with it. As it lowers, it closes orifices 28 in the spider nut. The handle 24 is held in place on stem 25 by screw 50 and key 51.

The form of the walls of the chamber 11, is preferably as indicated. It is bevelled at its lower peripheral edges 29, and flat at its upper surface 30. A stuffing box construction is provided as a recessed portion 32 in the plug 18, and comprises packing 52, sliding washer 53 and spring 54 and serves its usual purpose. A screw-threaded shell 33 is screwed onto a boss-like raised shoulder 34 and retains the plug in position securely. The temperature control turns on the upper surface of the shell 33 and has an extended arm 35 for its manipulation. This arm registers at points indexed on the shell according to the temperature to be derived of the mixed water in the mixing chamber. The lower chamber 13 and spout 14, rotate on ball bearings 55 positioned in cap 36. The cap is held to the body by screws 56. The lower chamber is bevelled along its peripheral upper rim 37 to fit tightly with the bevelled surface 38 formed on an internal shelf 39. This shelf surrounds and supports the spider nut 26 and acts as a partition between the chambers 11 and 13.

The spigot operates like a conventional spigot, except that the plug by its arrangements of passages 20 and 21, and their alignment with passages 22 and 23 respectively, causes a proper proportional mixture of the hot and cold water to combine at a designated temperature determined by the position of the arm 35. The amount of water passing through the spigot is controlled by the volume control.

It is therefore deemed unnecessary to detail such in further detail.

While but two general forms of the invention are shown in the drawings and described in the specifications it is not desired to limit this application for patent to this particular form, as it is appreciated that other forms could be made that would use the same principles and come within the scope of the appended claims.

Having thus described the invention what is claimed is:

1. A plumbing fixture comprising a dish-shaped body having a central mixing chamber therein, said body also having hot and cold water inlets to the chamber, a tapered plug valve having an axial bore and mounted axially of said body, said valve having ports to control the hot and cold water inlets, a spider element forming a lower wall of the mixing chamber, said element having a plurality of ports forming outlets from the mixing chamber, a valve in the chamber controlling said last mentioned ports, a stem on said last mentioned valve extending in the bore of the plug valve, a handle for said last mentioned valve carried by said stem above the plug valve, resilient means between said handle and said plug valve, and a spigot carried by said body and through which the water controlled by both of said valves may exit.

2. A fixture as set forth in claim 1, said first mentioned valve having indicating means to show the proportion in which the hot and cold water are mixed and means for mounting said faucet on said casing to allow rotation thereof in a plurality of directions.

CHARLES K. BROWN, Jr.

REFERENCES CITED

The following references are of record in the file of this patent:

UNITED STATES PATENTS

| Number | Name | Date |
|---|---|---|
| 531,585 | Cole | Dec. 25, 1894 |
| 1,097,433 | Hill | May 9, 1914 |
| 1,485,957 | Bridgham | Mar. 4, 1924 |
| 1,737,734 | Schlesinger | Dec. 3, 1929 |
| 1,911,044 | Thrasher | May 23, 1933 |
| 2,309,900 | Herring | Feb. 2, 1943 |

FOREIGN PATENTS

| Number | Country | Date |
|---|---|---|
| 60,928 | Switzerland | of 1913 |
| 739,519 | France | Nov. 3, 1932 |